Patented Dec. 18, 1928.

1,695,636

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

CHEMICAL PRODUCT AND PROCESS OF MAKING THE SAME.

No Drawing.   Application filed June 17, 1922.   Serial No. 569,138.

This invention relates to the treatment of rubber or rubber-like substances and kindred products with chlorine or a chlorine-containing gas preferably in the presence of hydrochloric acid and preferably under pressure.

The actual production of chlorinated rubber heretofore has been accomplished mostly by dissolving rubber in a solvent and treating with chlorine gas. Owing to the very restricted solubility of rubber it is necessary to use a great bulk of solvent, and to evaporate this and recover the chlorinated rubber involves considerable expense.

In the present invention it is an object to reduce the amount of solvent to such a minor quantity that it is inconsequential.

As sheet rubber especially crepe rubber found in commerce very often is somewhat oxidized on the surface or encrusted with a thin film which may resist the penetration of chlorine the rubber sheets are preferably masticated by passing through masticating rolls before being exposed to the action of the gaseous reagent.

In another form of the process the rubber may be masticated in the presence of chlorine gas the latter if desired being under pressure.

The rubber may if desired be exposed to a vacuum before treatment with chlorine in order to eliminate air from pockets or vesiculations.

The temperature of treatment may range considerably depending on the character of product desired. Treatment in the cold generally speaking is preferable to hot treatment as the products obtained are tougher as a rule when produced in the cold. However heating accelerates the reaction and may be used if desired.

The use of catalytic material is not excluded it being possible to masticate into the rubber a certain amount of a catalytic substance as for example iron chloride. Or iodine may be vaporized into the chlorine. Light also has an activating effect and sunlight or ultraviolet light or other forms of actinic light may be used or a combination of both catalyzers and light.

Another form of the invention involves masticating the rubber with or without a catalyzer and with or without the action of actinic light while chlorinating preferably under pressure.

The grades of rubber employed may range from raw or unvulcanized rubber in various forms including crepe rubber or sheets, Pontianak rubber or similar rubbers containing resins, or the de-resinated rubbers, also various synthetic rubbers.

Also various substances more or less allied to rubber such as chicle, balata, gutta percha, etc., may be employed in carrying out the process either by themselves or in admixture with rubber.

The chlorine employed may be the compressed pure gas as for example the liquefied chlorine or it may be used as obtained in the electrolysis of brine and containing perhaps twenty per cent or so of air. As obtained in this manner it is moist and is preferably dried before use. Iodine has been mentioned above for its benefit as a catalyzer and other halogens such as bromine and fluorine may be added if desired. Halogen-liberating agents may be employed in some cases but such substances as hypochlorites or hypochlorous acid ordinarily are not recommended owing to certain complications arising in connection with purifying the product.

The vessels employed for chlorination preferably should be lead or glass-lined. Iron for example if used as a container is liable to introduce ferric chloride into the mass in a manner such that a catalytic agent will be present here and there without any uniform distribution and therefore the reaction cannot be properly controlled.

In treating sheets of rubber it is best to have these fairly thin not exceeding an eighth to a fourth of an inch in thickness. Preferably if freshly masticated a desirable rate of chlorination is obtained. Chlorination progresses from the outer to the inner layers and removal of the product from the chlorinating chamber too soon will result in a central plane or layer of rubber which has remained unchlorinated or only very slightly chlorinated and hence not sufficiently soluble. Of course when a mixture of chlorinated and unchlorinated rubber is desired the reaction may be arrested prior to complete penetration. The penetration of the chlorine is very substantially increased by pressure and superatmospheric pressure ranging from 50 to 100 pounds or more may be employed.

An object of the present invention is to avoid too great a difference in the degree of chlorination between the outer and the inner layers. As the chlorination is progressive the outer layers become more vigorously treated and tend to chlorinate to too high a degree resulting in a highly brittle product. The process is therefore carried out in its preferred form in such a manner as to secure rapid penetration so that chlorination takes place throughout the mass as rapidly as possible thereby avoiding superchlorination of the exterior layers when this is not desired.

The rubber is preferably used in thin sheets, the treatment of the rubber just prior to chlorination by masticating it thoroughly to render it plastic and penetrable and the use of chlorine under a pressure well above atmospheric all tend to rapidity of chlorination.

The present invention as indicated in the foregoing involves in its preferred aspects the exposure of rubber or comminuted particles of rubber alone, to the action of chlorine gas under super-atmospheric pressure preferably in the cold or at room temperature or at temperatures not greatly elevated above room temperature.

It is, however, also within the scope of the invention in certain of its modifications to have incorporated with the rubber a small amount of solvent as for example benzol to the extent of 10 or 20% of the weight of the rubber and preferably in any event the amount of solvent not greater in weight than the weight of the rubber employed.

The present invention contemplates the treatment of rubber, softened with a small amount of solvent rather than treatment of solutions of rubber. When using benzol it is desirable to keep the mixture cold during the process, in order to avoid chlorination of the benzol to any undesirable degree. However chlorination of the benzol to monochlorbenzol with the production of a small amount of dichlorbenzol is not objectionable in some cases when the product for example is to be used as a coating compound and benzol of itself would be too volatile a solvent to brush out properly. In this case the chlorbenzol serves as a heavier or less volatile solvent.

In chlorinating rubber in solution (in accordance with certain prior patents) as for example where 2 or 3% of rubber is dissolved in carbon tetrachloride, and chlorine gas at atmospheric pressure is bubbled through the liquid, the molecules of the rubber are exposed to the action of chlorine in a substantially uniform manner so that fairly definite chlorinated products may be obtained. In the present invention treating rubber in comminuted or sheet form and preferably in a plastic state with chlorine the same uniformity of product is not so easily obtainable but chlorination may be carried on by the use of pressure of 100 pounds or higher to yield products containing a maximum amount of combined chlorine. Thus it is one object of the invention to produce for example the octa and deca chlor compounds or even higher chlorinated rubbers. It is advisable to start the chlorination with chlorine gas and as the chlorination of the outer layers of the rubber progresses, substitution as well as addition occurs and hydrochloric acid is produced. This penetrates with the chlorine toward the interior of the rubber layer and coming in contact with the fresh unsaturated rubber the hydrochloric acid may combine in greater or less degree depending on its concentration, on its pressure, temperature, etc. Thus instead of a chlorinated product strictly speaking a chlorinated and also somewhat hydrochlorinated substance is produced which may have a different orientation of the chlorine atoms from that produced in the direct chlorination of rubber dissolved in a solvent.

As an example of a method which will serve to illustrate the invention the following procedure is given. A strong receiver of steel which may be lead or enamel lined or may contain a lead receptacle is used as a treating vessel. Fragments or sheets of rubber are placed in the container in such a way as to be free from danger of contamination with ferric chloride and the air is exhausted from the vessel. Chlorine is then admitted the pressure being allowed to increase to several atmospheres, 60 to 100 pounds being desirable. A pressure of at least 50 pounds and preferably 60 pounds is recommended as the penetration of chlorine takes place very slowly below these pressures. On the other hand if the pressure is increased to somewhat over 100 pounds depending upon the room temperature. Chlorine may be applied in the liquid form. While rubber may be treated with chlorine in the liquid state according to one modification, in the present illustration the temperature of the receiver is kept at such a point that under the pressure used chlorine is not condensed into the liquid state. At a pressure between 50 and 100 pounds the action may be permitted to go on for 50 to 100 hours at room temperature or at a temperature between 20 to 30° C. until the chlorine has penetrated through the rubber sheets or pieces and a sample on removal dissolves readily in benzol to form a clear substance very largely devoid of the viscous properties and low solubility of the original rubber. When the desired degree of solubility is obtained the chlorinated material is removed and treated in any suitable manner to remove adhering (not chemically combined) hydrochloric acid and chlorine. For example it may be ground and washed with water or weak alkaline solutions or it may be carefully heated to expel the acid gases. When well chlorinated the product will dissolve readily in benzol to form a solution of 40 to 50 per cent concentration which thus enables a liquid coating medium to be produced containing an amount of solid non-volatile substance present akin to that found in ordinary varnishes made from resins and oils. More dilute solutions such as 20 to 25% can also be made. An octa to a deca chlor compound may thus be obtained which when dissolved in suitable volatile solvents may be incorporated with Chinese wood oil, linseed oil and the like to yield varnishes and coating compounds having a desirable resistance to various agents. On the other hand the chlor compound itself of this high degree of chlorination containing say from 70 to 80 per cent of combined chlorine without the use of oil or any softening agent or agents to give flexibility may be used as a coating medium when especially high resistance is desired but where flexibility is not so important a consideration.

What I claim is:—

1. The process of treating rubber to make a substance readily soluble in various organic solvents which consists in exposing unvulcanized dry solid sheet rubber containing incorporated therewith, less than 20% of benzol, to the action of chlorine gas under super-atmospheric pressure.

2. The process of treating rubber to make a substance readily soluble in various organic solvents which consists in exposing a somewhat softened masticated solid rubber containing not substantially over 20% of liquid aromatic hydrocarbon, to the action of chlorine gas under super-atmospheric pressure.

3. A process which comprises substantially increasing the plasticity of rubber without dissolving same by incorporating with said rubber, in an unvulcanized state, an amount of aromatic hydrocarbon rubber solvent, the amount of said unvulcanized rubber being at least as great as the amount of said solvent, and then treating the plasticized material with chlorine under super-atmospheric pressure until it is chlorinated to a stage above heptachlorcaoutchouc.

CARLETON ELLIS.